(12) United States Patent
Mirza et al.

(10) Patent No.: US 12,741,529 B2
(45) Date of Patent: Sep. 22, 2026

(54) FUEL TRANSMISSION SYSTEM

(71) Applicant: Tusas-Turk Havacilik Ve Uzay Sanayii Anonim Sirketi, Kahramankazan (TR)

(72) Inventors: Berke Alp Mirza, Kahramankazan (TR); Mustafa Bahadir Karahan, Kahramankazan (TR)

(73) Assignee: Tusas-Turk Havacilik Ve Uzay Sanayii Anonim Sirketi, Kahramankazan (TR)

( * ) Notice: Subject to any disclaimer, the term of this patent is extended or adjusted under 35 U.S.C. 154(b) by 0 days.

(21) Appl. No.: 18/967,782

(22) Filed: Dec. 4, 2024

(65) Prior Publication Data

US 2025/0214418 A1 Jul. 3, 2025

(30) Foreign Application Priority Data

Dec. 28, 2023 (TR) ............................... 2023/019227

(51) Int. Cl.
*B60K 15/04* (2006.01)

(52) U.S. Cl.
CPC ...... *B60K 15/04* (2013.01); *B60K 2015/0458* (2013.01); *B60Y 2200/50* (2013.01)

(58) Field of Classification Search
CPC ........ B64D 37/06; B64D 37/04; B64D 37/02; B64D 37/12; B60K 2015/0458; B60K 15/04; B60Y 2200/50
See application file for complete search history.

(56) References Cited

U.S. PATENT DOCUMENTS

| | | | | |
|---|---|---|---|---|
| 9,926,083 | B2 * | 3/2018 | Powell | F16K 1/465 |
| 2006/0185760 | A1 * | 8/2006 | Matsuzaki | F16L 41/082<br>285/204 |
| 2017/0108029 | A1 * | 4/2017 | Song | F16B 47/00 |

* cited by examiner

*Primary Examiner* — Jason K Niesz

(57) ABSTRACT

The present invention relates to a body (2) that is located on the aircraft, at least one external tank (T) that is located on the body (2) and provides fuel accumulation, at least one valve (3) that is located between the body (2) and the external tank (T) and provides fuel transmission, at least one opening (4) that is located on the valve (3) and allows the fuel passage between the body (2) and the external tank (T), a gear region (5) that is located oppositely on the body (2) and on the valve (3) and allows the valve (3) to be mounted on the body (2), and at least one sealing element (6) that is located between the body (2) and the valve (3) in a way surrounding the valve (3) and prevents fuel from leaking into the body (2).

8 Claims, 1 Drawing Sheet

FUEL TRANSMISSION SYSTEM

RELATED APPLICATION

This application claims the benefit of priority of Turkey Patent Application No. 2023/019227 filed on Dec. 28, 2023, the contents of which are incorporated by reference as if fully set forth herein in their entirety.

FIELD AND BACKGROUND OF THE INVENTION

The present invention relates to external fuel tanks in aircraft and fuel transfer systems between aircrafts.

External fuel tanks in aircraft are additional fuel tanks added to the main body of the aircraft, usually mounted under the wings or on the body. External tanks are used to increase the range of the aircraft or to carry extra fuel for special missions. There are fuel lines in aircraft that provide fuel flow between the external fuel tank and the main tank. While the aircraft can fly with an external fuel tank, in some special cases, it is expected that the external fuel tank will be removed while the aircraft is in the air. In order for the aircraft to have this capability, an external fuel tank quick disconnect valve is used. At the same time, the quick disconnect valve reduces maintenance labour and prevents uncontrolled fuel flow when the pylon or external fuel tank is mounted and demounted from the aircraft during maintenance while the aircraft is on the ground.

In the United States patent document numbered U.S. Pat. No. 9,926,083B2 in the state of the art, a valve used to connect an external tank to an aircraft is mentioned. The valve comprises a valve body and a seal assembly configured to be resiliently connected to a seal surface in an aircraft during use. The seal assembly comprises a telescopic seal element extending from the proximal end to the distal end within the valve body.

SUMMARY OF THE INVENTION

A fuel transmission system developed with the present invention provides effective corrosion protection for quick disconnect valves used in external aircraft fuel tanks.

Another object of the present invention is to reduce the diameters of the insert gears used while mounting quick disconnect valves used in external aircraft fuel tanks to aircraft to have standard dimensions.

The fuel transmission system defined in the first claim and the claims dependent on this claim, which is realised to achieve the aim of the invention, comprises a body that is located on the aircraft. There is at least one external tank on the body where fuel is accumulated. The external fuel tank is used to store extra fuel outside the main fuel system of the aircraft. The external fuel tank is generally mounted under the wing of the aircraft or on the body by means of support structures called "pylon". There is at least one valve between the body and the external tank. The valve provides fuel transmission between the main fuel tank of the aircraft and the external tank and controls the fuel flow. There is at least one opening on the valve. The opening allows fuel transmission between the body and the external tank. There is a gear region on the body and on the valve opposite each other. The mounting is made by means of gears that are located in the gear region at the connection points of the valve to the body. There is at least one sealing element between the body and the valve. The sealing element can preferably be in the form of an O-ring. The sealing element that completely surrounds the valve is squeezed between the valve and the body, thus prevents fuel from leaking into other equipment outside the tank that is located inside the body.

Said fuel transmission system comprises a sealing element that prevents the fuel transmitted between the body and the external tank through the opening from reaching the gear region. The sealing element surrounds the valve in a way that limits the area of the valve that is in contact with the fuel with the opening. Thus, fuel does not reach the gear region that allows the valve to be mounted on the body. At least one coating is made on the gear region. The gear region is located between the body and the valve. The body is preferably made of aluminium material, while the valve is made of steel material. The free corrosion potentials of the body and the valve made of different materials are different. For this reason, galvanic compatibility is provided between the body and the valve by means of the coating made on the gear region that is located between the body and the valve. The metals with different free corrosion potentials coming together causes interaction between the metals. The contact and proximity of different metals can lead to electrochemical reactions and corrosion. A galvanic compatible coating is made on the gear region to prevent corrosion and interaction.

In one embodiment of the invention, the fuel transmission system comprises a coating produced with cadmium or zinc-nickel. The coating containing zinc and nickel alloys is used to provide electrochemical compatibility between different metals. The coating creates a surface that is electrochemically inert and has corrosive resistance. Thus, the body and the valve have a long life and their reliability increases. At the same time, extra protection against corrosion is provided.

In one embodiment of the invention, the fuel transmission system comprises a coating produced in the form of a filler or paste. By means of the filler or paste form, the coating provides good adhesion to the body and valve surfaces and has long-term durability. By means of its form, the coating can be easily applied to surfaces and provides effective protection against corrosion.

In one embodiment of the invention, the fuel transmission system comprises sealing elements that are located oppositely on the valve. There is an opening on the valve. There are sealing elements above and below the opening. Sealing elements limit the area in contact with the fuel via the opening. Thanks to the sealing elements, fuel cannot reach the gear region. In the case that the coatings, preferably containing cadmium or zinc-nickel, come into contact with the fuel, the coatings dissolve. Since the coatings are not resistant to fuel, the gear region becomes vulnerable to corrosion when they come into contact with the fuel. For this reason, fuel passage to the gear region is prevented in order to prevent contact between the gear region and the fuel. In this way, galvanic compatible coating can be applied on the gear region.

In one embodiment of the invention, the fuel transmission system comprises a slot on the body. The valve is mounted on the body by passing through the slot. The threads on the valve and the threads on the body opposite to them form the gear region together. When the valve is passed through the slot, the gear region remains outside the external tank, thus the gear region does not come into contact with the fuel. An insert gear is used in the gear region so that the aluminium body and the steel valve do not deform. Standard sized insert gears can be used in the gear region that is located in the top area of the valve, which is not in contact with the fuel.

In one embodiment of the invention, the fuel transmission system comprises a gear region surrounded by a slot wall.

When the valve is mounted on the body, the surroundings of the gear region are closed with the slot wall.

In one embodiment of the invention, the fuel transmission system comprises a sealing element between the opening and the gear region. In this way, fuel does not reach the gear region and a galvanic compatible coating can be applied on the gear region.

In one embodiment of the invention, the fuel transmission system comprises a flange on the valve. When the valve is mounted on the body, torque is applied to the flange.

BRIEF DESCRIPTION OF SEVERAL VIEWS OF THE DRAWINGS

The fuel transmission system realised to achieve the aim of the present invention is shown in the attached figures, and of these figures.

DESCRIPTION OF SPECIFIC EMBODIMENTS OF THE INVENTION

Figure 1:
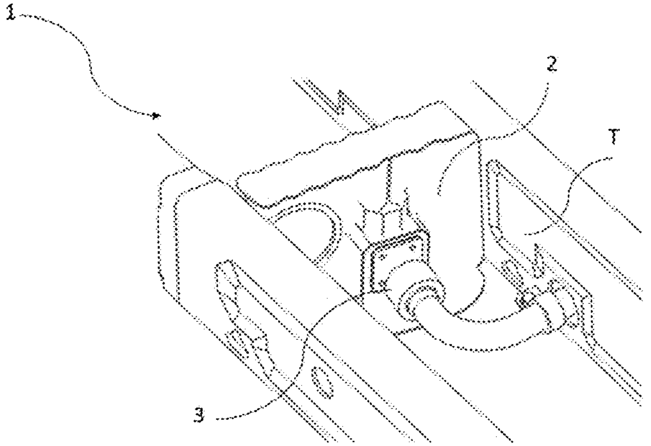
FIG. 1 shows the perspective view of the fuel transmission system.

The parts in the figures are numbered one by one and the equivalents of these numbers are given below.

1. Fuel transmission system
2. Body
3. Valve
4. Opening
5. Gear region
6. Sealing element
7. Coating
8. Slot
9. Flange
(T) External tank The fuel transmission system (1) comprises a body (2) that is located on the aircraft, at least one external tank (T) that is located on the body (2) and provides fuel accumulation, at least one valve (3) that is located between the body (2) and the external tank (T) and provides fuel transmission, at least one opening (4) that is located on the valve (3) and allows the fuel passage between the body (2) and the external tank (T), a gear region (5) that is located oppositely on the body (2) and on the valve (3) and allows the valve (3) to be mounted on the body (2), and at least one sealing element (6) that is located between the body (2) and the valve (3) in a way surrounding the valve (3) and prevents fuel from leaking into the body (2).

The fuel transmission system (1) which is the subject of the invention, comprises a sealing element (6) which prevents the fuel coming out of the opening (4) from reaching the gear region (5), and at least one coating (7) that is on the gear region (5) and provides galvanic compatibility between the body (2) and the valve (3) and thus prevents corrosion.

The fuel transmission system (1) comprises a body (2) that is located on the aircraft. An external tank (T) is located on the body (2). The fuel is located in the external tank (T) and the spare fuel in the external tank (T) is used in cases where the main fuel system is insufficient. At least one valve (3) is located between the body (2) and the external tank (T). The valve (3) provides fuel transmission between the body (2) and the external tank (T). There is at least one opening (4) on the valve (3) which allows fuel flow between the body (2) and the external tank (T). The valve (3) is mounted on the body (2) by means of the gear region (5) that is located opposite each other on the body (2) and the valve (3). There is at least one sealing element (6) between the body (2) and the valve (3). The sealing element (6) prevents fuel from leaking into the body (2). (FIG. 1)

Figure 2:
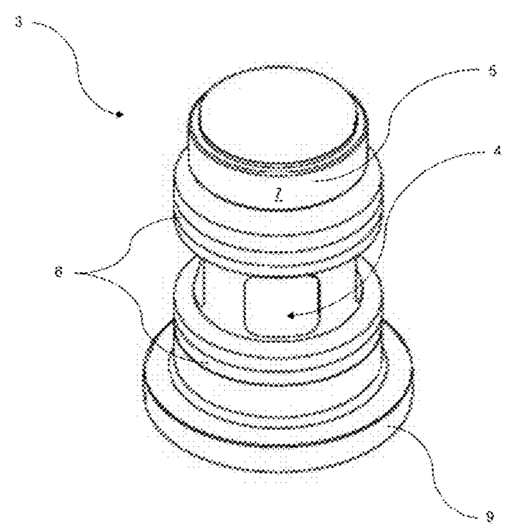
FIG. 2 shows the perspective view of the valve.

The fuel transmission system (1) comprises a sealing element (6) that prevents fuel from reaching the gear region (5). The fuel is transmitted between the body (2) and the external tank (T) via the opening (4). The sealing element (6) surrounds the valve (3) in a way that limits the area of the valve (3) that is in contact with the fuel via the opening (4) and is preferably located both below and above the opening (4). At least one coating (7) with galvanic compatibility is applied on the gear region (5). The body (2) and the valve (3) are made of different materials. The gear region (5) that is located between the body (2) and the valve (3) is covered with coating (7) to prevent corrosion that may occur due to the body (2) and the valve (3) being made of different materials and to ensure galvanic compatibility. (FIG. 2)

In one embodiment of the invention, the fuel transmission system (1) comprises a coating (7) containing cadmium or zinc-nickel. A surface resistant to chemical reaction is provided between the valve (3) and the body (2) by means of the coating (7) containing cadmium or zinc-nickel alloys.

In one embodiment of the invention, the fuel transmission system (1) comprises a coating (7) produced in the form of a filler or paste, which provides adhesion. By means of the filler or paste form, it is easier for the coating (7) to adhere to the gear region (5) and provide effective protection.

In one embodiment of the invention, the fuel transmission system (1) comprises sealing elements (6) that are located on the valve (3) opposite each other, with an opening (4) between them. By means of the sealing elements (6), the flow of fuel between the body (2) and the valve (3) is limited by the opening (4). Thus, the fuel does not reach the gear region (5).

Figure 3:
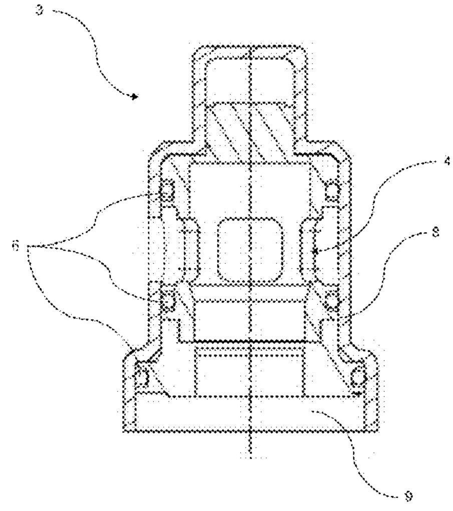
FIG. 3 shows the sectional view of the valve.

In one embodiment of the invention, the fuel transmission system (1) comprises a slot (8) that is on the body (2) and allows the valve (3) to be mounted on the body (2) by passing the valve (3) through it, and a gear region (5) that is located oppositely on the body (2) and the valve (3) so that it remains outside the external tank (T) when the valve (3) is passed through the slot (8), so that a standard sized insert gear can be used since there is a distance between it and the fuel. The valve (3) that is passed through the slot (8) is mounted on the body (2). When the valve (3) is mounted on the body (2), the gear region (5) is located outside the external tank (T) so that the fuel does not come into contact with the gear region (5). Since the gear region (5) is located on the upper part of the valve (3), standard insert gears can be used in the gear region (5). (FIG. 3)

In one embodiment of the invention, the fuel transmission system (1) comprises a gear region (5) surrounded and closed by the slot (8) wall.

In one embodiment of the invention, the fuel transmission system (1) comprises a gear region (5) having a sealing element (6) between it and the opening (4). Thanks to the sealing element (6), the fuel does not reach the gear region (5).

In one embodiment of the invention, the fuel transmission system (1) comprises a flange (9) on the valve (3) to which torque is applied so that the valve (3) can be mounted to the body (2). The valve (3) is mounted to the body (2) by means of the flange (9).

The invention claimed is:

1. A fuel transmission system comprising:

an aircraft body structure configured for fuel containment;

at least one external tank mounted on the aircraft body structure, the external tank configured to accumulate fuel;

at least one valve disposed between the aircraft body structure and the external tank, the valve configured to transmit fuel between the aircraft body structure and the external tank;

at least one opening on the valve, the opening configured to allow fuel passage between the aircraft body structure and the external tank;

a threaded region formed on opposing surfaces of the aircraft body structure and the valve, the threaded region configured to mount the valve to the aircraft body structure;

at least one first sealing element disposed between the aircraft body structure and the valve and surrounding the valve, the first sealing element configured to prevent fuel from leaking into the aircraft body structure;

at least one second sealing element disposed between the opening and the threaded region, the second sealing element configured to prevent fuel from the opening from reaching the threaded region; and at least one coating on the threaded region, the coating configured to provide galvanic compatibility between the aircraft body structure and the valve, thereby preventing corrosion.

2. The fuel transmission system according to claim 1, wherein the coating contains cadmium or zinc-nickel.

3. The fuel transmission system according to claim 1, wherein the coating is produced in the form of a filler or paste to provide adhesion to the threaded region.

4. The fuel transmission system according to claim 1, wherein the at least one second sealing element comprises two sealing elements located on opposite sides of the opening on the valve.

5. The fuel transmission system according to 1, wherein the aircraft body structure comprises a slot through which the valve is inserted to mount the valve to the aircraft body structure, and wherein the threaded region is positioned so as to remain outside the external tank when the valve is passed through the slot, such that the threaded region is spaced apart from fuel within the external tank.

6. The fuel transmission system according to claim 1, wherein the at least one second sealing element is disposed between the opening and the threaded region along the valve.

7. The fuel transmission system according to claim 5, wherein the threaded region is surrounded and enclosed by a wall of the slot.

8. The fuel transmission system according to claim 1, wherein the valve comprises a flange configured to receive torque for mounting the valve to the aircraft body structure.

* * * * *